United States Patent [19]

Seydl

[11] 3,923,728

[45] Dec. 2, 1975

[54] FLAME-RETARDANT AND SELF-EXTINGUISHING MOLDING COMPOSITIONS

[75] Inventor: Wolfgang Seydl, Frankenthal, Germany

[73] Assignee: BASF Aktiengesellschaft, Ludwigshafen (Rhine), Germany

[22] Filed: Sept. 24, 1973

[21] Appl. No.: 400,177

[30] Foreign Application Priority Data

Sept. 28, 1972 Germany................2247652

[52] U.S. Cl.. 260/40 R; 260/45.75 R; 260/45.75 K; 260/45.8 A; 260/DIG. 24
[51] Int. Cl.$^2$.... C08K 3/22; C08K 5/02; C08K 7/12
[58] Field of Search.... 260/40 R, DIG. 24, 45.75 R, 260/45.75 K, 45.8 A

[56] References Cited
UNITED STATES PATENTS

| | | | |
|---|---|---|---|
| 2,779,701 | 1/1957 | Robitschek et al............. | 260/869 X |
| 3,287,395 | 11/1966 | Chong............................. | 260/468 |
| 3,362,928 | 1/1968 | Dontji et al..................... | 260/41 |
| 3,403,036 | 9/1968 | Hindersinn et al............ | 260/45.75 R |
| 3,624,024 | 11/1971 | Caldwell et al................. | 260/40 R |
| 3,632,544 | 1/1972 | Boyer............................. | 260/45.8 A |
| 3,711,562 | 1/1973 | Maul et al...................... | 260/DIG. 24 |
| 3,751,396 | 8/1973 | Gall................................. | 260/40 R |
| 3,814,725 | 6/1974 | Zimmerman et al........... | 260/40 R |

*Primary Examiner*—Donald E. Czaja
*Assistant Examiner*—S. M. Person
*Attorney, Agent, or Firm*—Johnston, Keil, Thompson & Shurtleff

[57] ABSTRACT

Molding compositions based on polybutylene terephthalate which are flame-retardant and self-extinguishing are obtained by incorporating a mixture of 5 to 30% by weight of a Diels-Alder adduct of hexachlorocyclopentadiene, 1 to 15% by weight of a metal compound having a synergistic action therewith and 1 to 10% by weight of a natural silicate into the polycondensate, the percentages by weight being relative to the amount of polyester used.

6 Claims, No Drawings

FLAME-RETARDANT AND SELF-EXTINGUISHING MOLDING COMPOSITIONS

The invention relates to molding compositions based on polybutylene terephthalate which are flame-retardant and self-extinguishing.

Polyesters based on polybutylene terephthalate which can be processed by thermoplastic methods are outstandingly useful as injection molding compositions. The moldings have excellent mechanical properties, such as toughness, stiffness and surface hardness.

However, it is a disadvantage of polybutylene terephthalate moldings that on contact with a flame they burn very sootily. On exposure to an open flame the material melts with decomposition and flaming particles are dripped, which can lead to spread of the fire. In particular, this is true if reinforcing materials such as, say, glass fibers have been added to the moldings. Since in numerous fields the possible applications of moldings are essentially determined by the flammability rating of the particular material, the ready flammability of polybutylene terephthalate described above hampers the use of this material in many fields, such as, say, electrical engineering or household appliances.

As a result, there exists a need to manufacture polybutylene terephthalate moldings which exhibit all the useful processing characteristics and mechanical properties of polybutylene terephthalate injection moldings without having the said disadvantages, which means that they should contain as little foreign matter as possible.

In the present context, "self-extinguishing" means that after removal of the source of ignition the test specimen does not continue to burn and the flame does not spread, and that even after a second ignition the flame does not spread along a bar-shaped specimen beyond a certain mark. "Non-dripping" means that no molten particles are released during or after the exposure of a horizontally or vertically fixed test specimen to the flame. It is particularly this requirement which is important in assessing the flammability of thermoplastics.

It is an object of the present invention to provide molding compositions based on polybutylene terephthalate in which the advantageous processing characteristics are not impaired but from which moldings which possess good mechanical properties and are flame-retardant, self-extinguishing and non-dripping can be manufactured.

We have found that this object is achieved by a molding composition based on polybutylene terephthalate which contains 1. 5 to 30 per cent by weight, preferably 7.5 to 20 percent by weight, of a Diels-Alder adduct of hexachlorocyclopentadiene,
2. 1 to 15 per cent by weight, preferably 2.5 to 10 per cent by weight, of a metal compound having synergistic action and
3. 1 to 10 per cent by weight of a natural silicate relative to the amount of polybutylene terephthalate employed.

For the purpose of the invention, Diels-Alder adducts of 2 moles of hexachlorocyclopentadiene and 1 mole of cyclopentadiene, furan, dicyclopentadiene, 1,5-cyclooctadiene or dicyclo-(2,2,1)-heptadiene, or 1 mole of hexachlorocyclopentadiene and 1 mole of tetrabromostyrene, have proved to be particularly suitable.

Synergistic metal compounds which can be used are above all compounds of iron, zinc, antimony, tin and bismuth, in particular in the form of their oxides, and preferably antimony trioxide.

The natural silicate employed as an inert filler is preferably asbestos.

The polyester molding compositions according to the invention contain polybutylene terephthalate which can be modified by up to 20 mole per cent of other dicarboxylic acids or alcohols. Examples of modifiers which can be used are aliphatic dicarboxylic acids of up to 20 carbon atoms, or cycloaliphatic or aromatic dicarboxylic acids with 1 or 2 aromatic rings. Examples thereof are adipic acid, sebacic acid, cyclohexanedicarboxylic acid, isophthalic acid and 2,7- and 2,6-naphthalenedicarboxylic acid.

Alcoholic modifiers which can be used are in particular aliphatic and cycloaliphatic glycols of 2 to 10 carbon atoms, such as ethylene glacol, propylene glycol, hexamethylene glycol, neopentyl glycol, diethylene glycol and 1,4-bis-hydroxymethyl-cyclohexane as well as 4,4-dihydroxydiphenyl-propane-2,2, substituted bisphenols and their reaction products with ethylene oxide.

To improve the properties of the material it can also be desirable to co-condense small amounts of trifunctional or higher polyfunctional crosslinking agents such as trimethylolpropane or trimesic acid into the polybutylene terephthalate.

In addition to the additives according to the invention, the flame-retardant polyester molding compositions can contain further additives, such as dyes, pigments, stabilizers against thermal, thermo-oxidative and ultraviolet degradation, antistatic agents, lubricants and processing auxiliaries which ensure trouble-free extrusion and injection molding, provided these additives do not affect the flame retardancy.

The polybutylene terephthalate employed for the manufacture of the molding compositions according to the invention has a relative viscosity of 1.3 to 1.8, preferably 1.5 to 1.7. The relative viscosity was determined in 0.5% strength solution in a phenol/o-dichlorobenzene mixture (3:2) at 25°C using an Ubbelohde viscometer.

The molding compositions according to the invention are preferably manufactured by mixing granular polybutylene terephthalate with the additives according to the invention, melting and homogenizing the mixture in an extruder, extruding into a water bath, granulating and drying. Another possible method is to introduce the additives into the condensation apparatus immediately after completion of the polycondensation.

The molding compositions according to the invention are suitable for the manufacture of moldings which are used, for example, in electrical engineering or for household appliances.

The burning characteristics were tested on bar-shaped injection moldings by a test based on Standard Specification ASTM D 635-68 "Flammability of Self-Supporting Plastics" and by the test method of Underwriters' Laboratories Inc. (compare H. Reymers "New flammability indexes: What they are, what they mean", Modern Plastics, October 1970, pages 92 et seq.).

The test specimens for the ASTM test were 12.7 cm long, 1.27 cm wide and 0.635 cm thick. The test was carried out as a horizontal test on 10 specimens in each case. A specimen was clamped horizontally and flamed for 30 seconds with a 2.5 cm high, non-luminous bunsen burner flame. At the end of the 30 seconds, the burner was removed and the time at which the specimen ceased to burn was determined. Immediately thereafter, the specimen was again ignited for 30 seconds. The specimen was judged to be self-extinguishing if, after being ignited twice, it did not burn to a mark 2.54 cm from the edge of the specimen at which the ignition took place.

The test according to the recommendations of Underwriters' Laboratories Inc. ("UL test") was carried out as a vertical test with test specimens 12.7 cm long, 1.27 cm wide and 0.16 cm thick. After flaming for 10 seconds with a 2 cm high, non-luminous bunsen burner flame a one-minute interval was allowed; the specimen was then again ignited for 10 seconds. The test was carried out on 10 specimens in each case, the specimens being tested in the as-received condition and also after 7 days' storage at 70°C. If the material is to pass the test and be granted classification SE 0 or SE 1, not only should the burning times be as short as possible but also during and after ignition no flaming particles should be dripped.

proofing agents (Comparison Experiment D), relative to the amount of polyester, polybutylene terephthalate molding compositions which achieve classification SE 1 under the conditions of the "UL test" are not obtained.

In contrast, the conjoint use of small amounts of asbestos with the additives which favor flame retardancy gives non-dripping and self-extinguishing polybutylene terephthalate moldings. Furthermore, it is possible to keep the total amount of flame-retardants low, which has an advantageous effect on the processing characteristics and mechanical properties of the polyester compositions.

TABLE 1

| Experiment | Additive | UL-Test[1] | Dripping[2] | Self-extinguishing[2] | Burning time[2] |
|---|---|---|---|---|---|
| A | 10% of Diels-Alder adduct 6% of antimony trioxide | — | Yes | No | >60" |
| B | 15% of Diels-Alder adduct 5% of antimony trioxide | — | Yes | No | >60" |
| C | 15% of Diels-Alder adduct 10% of antimony trioxide | SE 2 | Yes | No | approx. 60" |
| D | 20% of Diels-Alder adduct | SE 2 | Yes | Yes | <60" |

The percentages quoted are relative to the amount of polybutylene terephthalate
[1]Test specimens of size 12.7 cm × 1.27 cm × 0.16 cm - vertical test
[2]Test specimens of size 12.7 cm × 1.27 cm × 0.6 cm - horizontal test

COMPARISON EXPERIMENT A 5.0 kg of granular polybutylene terephthalate of relative viscosity 1.655 were thoroughly mixed with 500 g of a Diels-Alder adduct from 2 moles of hexachlorocyclopentadiene and 1 mole of 1,5 -cyclooctadiene and with 300 g of antimony trioxide, and the mixture was melted and homogenized in an extruder and granulated after having passed through a water bath. The granules were subsequently thoroughly dried and used to produce test specimens of size 12.7 × 1.27 × 0.6 cm and 12.7 × 1.27 × 0.16 cm on an injection molding machine.

The horizontal test based on Standard Specification ASTM D 635–68 gave very long burning times; furthermore, polyester melt dripped off even during the first flaming.

The "UL test" with vertically clamped specimens 0.16 cm thick gave a similar picture: during the first flaming, polyester melt dripped off the specimen. The flame spread rapidly and the entire specimen was burning within a few seconds.

COMPARISON EXPERIMENTS B–D

Increasing amounts of the Diels-Alder adduct from 2 moles of hexachlorocyclopentadiene and 1 mole of 1,5-cyclooctadiene were incorporated, together with antimony trioxide, into polybutylene terephthalate under the conditions indicated in comparison experiment A. The amounts added and the results of the burning tests are summarized in Table 1.

The table shows that even with 25% of flameproofing agents (Comparison Experiment C) or 30% of flame- The Examples which follow are intended to illustrate the invention.

EXAMPLE 1

5.0 kg of granular polybutylene terephthalate of relative viscosity 1.625 were thoroughly mixed with 625 g of a Diels-Alder adduct of 2 moles of hexachlorocyclopentadiene and 1 mole of 1,5-cyclooctadiene, 350 g of antimony trioxide and 375 g of asbestos and the mixture was melted and homogenized in an extruder and granulated after passing through a water bath. The granules were subsequently dried and used on an injection molding machine to produce test specimens 12.7 cm long, 1.27 cm wide and 0.16 cm thick.

These specimens were clamped vertically and tested according the specifications of the UL test. The burning time of the specimens which were tested in the as-received condition after removing the source of ignition averaged 7.9 seconds (10 bars were tested). In no case did polyester melt drip off; this molding composition thus qualifies for classification SE 1.

A further 10 specimens were stored for 7 days at 70°C. The test described above was then carried out again. The average burning time was 3.6 seconds. Polyester melt did not drip off and the material qualified for classification SE 0.

In addition, test specimens of size 12.7 × 1.27 × 0.6 cm and of relative viscosity 1.58 (corrected value) were produced. These were tested by the horizontal burning test. After 30 seconds' ignition, the flame on the specimens went out immediately after removing the source of ignition. A similar result was found on the second ignition. On neither ignition did the polyester melt drip off.

EXAMPLE 2

4.5 kg of polybutylene terephthalate of relative viscosity = 1.645, 675 g of the reaction product of 2 moles of hexachlorocyclopentadiene with 1 mole of 1,5-cyclooctadiene, 315 g of antimony trioxide and 180 g of asbestos were thoroughly mixed and converted, as described in Example 1, into 0.6 and 0.16 cm thick test specimens.

When tested by the UL test the material qualified for classification SE 0.

In the horizontal test, the flame on the specimen in every case went out immediately after removing the source of ignition; in no case did melt drip off.

EXAMPLE 3

3.5 kg of polybutylene terephthalate, 350 g of a Diels-Alder adduct of 1 mole of hexachlorocyclopentadiene and 1 mole of tetrabromostyrene, 175 g of antimony trioxide and 140 g of asbestos were converted into test specimens of size 12.7 × 1.27 × 0.6 cm as described in Example 1 and subjected to the horizontal burning test. In each case, the flame went out on removing the burner and no polyester melt dripped off.

EXAMPLE 4

3.5 kg of granular polybutylene terephthalate of relative viscosity 1.645, 525 g of a Diels-Alder adduct of 2 moles of hexachlorocyclopentadiene and 1 mole of furan, 245 g of antimony trioxide and 140 g of asbestos were together converted into test specimens of size 12.7 × 1.27 × 0.16 as described in Example 1, and the specimens were subjected to the vertical UL test. The material qualified for classification SE 1 both in the as-received condition and after 7 days' storage at 70°C.

I claim:

1. Molding compositions based on polybutylene terephthalate which are flame-retardant and self-extinquishing and do not drip during and after flaming, and which comprise
   A. 5 to 30% by weight of a Diels-Alder adduct of 2 moles of hexachlorocyclopentadiene and either 1 mole of cyclopentadiene, furan, dicycopentadiene, 1,5-cyclooctadiene or dicyclo-(2,2,1)-heptadiene,
   B. 1 to 15% by weight of a metal compound having synergistic action and,
   C. 1 to 10% by weight of a natural silicate, the percentages by weight of components A, B and C being relative to the amount of polyester used.

2. Molding compositions based on polybutylene terephthalate which are flame-retardant and self-extinguishing and do not drip during and after flaming, and which comprise a mixture consisting of
   A. 5 to 30% by weight of a Diels-Alder adduct of 2 moles of hexachlorocyclopentadiene and either 1 mole of cyclopentadiene, furan, dicyclopentadiene, 1,5-cyclooctadiene or dicyclo-(2,2,1)-heptadiene,
   B. 1 to 15% by weight of a metal compound having synergistic action and
   C. 1 to 10% by weight of a natural silicate, the percentages by weight of the components A, B and C being relative to the amount of polyester used.

3. Molding compositions as claimed in claim 1, wherein the Diels-Alder adduct of hexaclorocyclopentadiene consists of an adduct of 2 moles of hexachlorocyclopentadiene and 1 mole of 1,5-cyclooctadiene or furan or of an adduct of 1 mole of hexachlorocyclopentadiene and 1 mole of tetrabromostyrene.

4. Molding compositions as claimed in claim 1, wherein the synergistically active metal compound consists of antimony trioxide.

5. Molding compositions as claimed in claim 1, wherein the natural silicate consists of asbestos.

6. Molding composition as set forth in claim 1 wherein said metal compound (B) is an oxide of iron, zinc, antimony, tin or bismuth.

* * * * *